J. W. CUNNINGHAM.
MULTIPLE LATHE TOOL POST.
APPLICATION FILED DEC. 4, 1918. RENEWED JUNE 11, 1920.
1,366,249.
Patented Jan. 18, 1921.
2 SHEETS—SHEET 2.
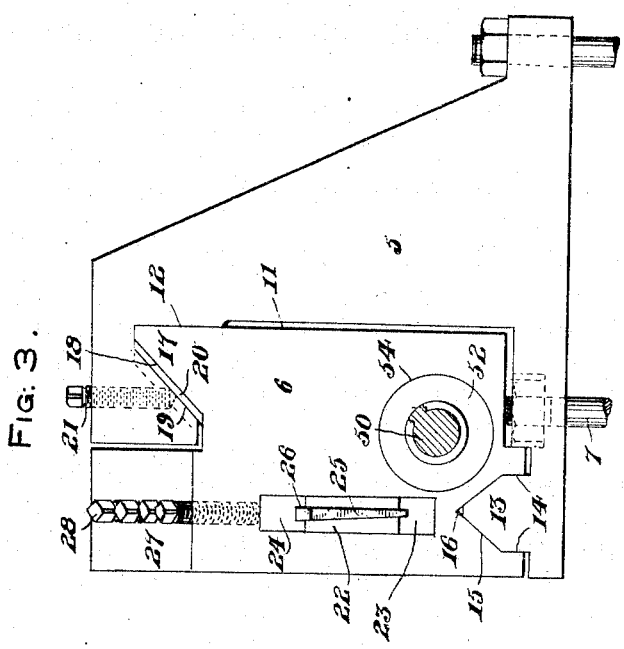
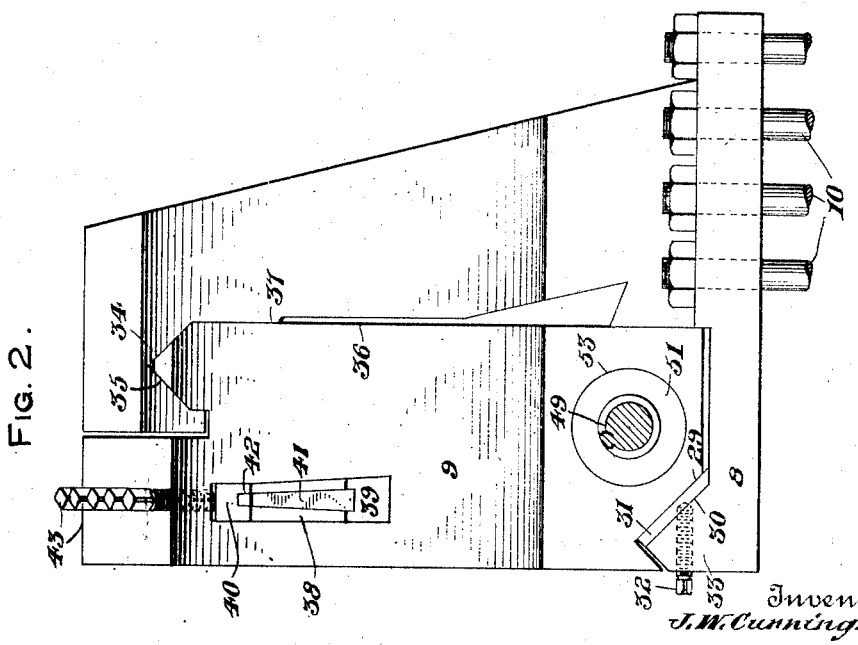
Inventor
J. W. Cunningham
By 
Attorney

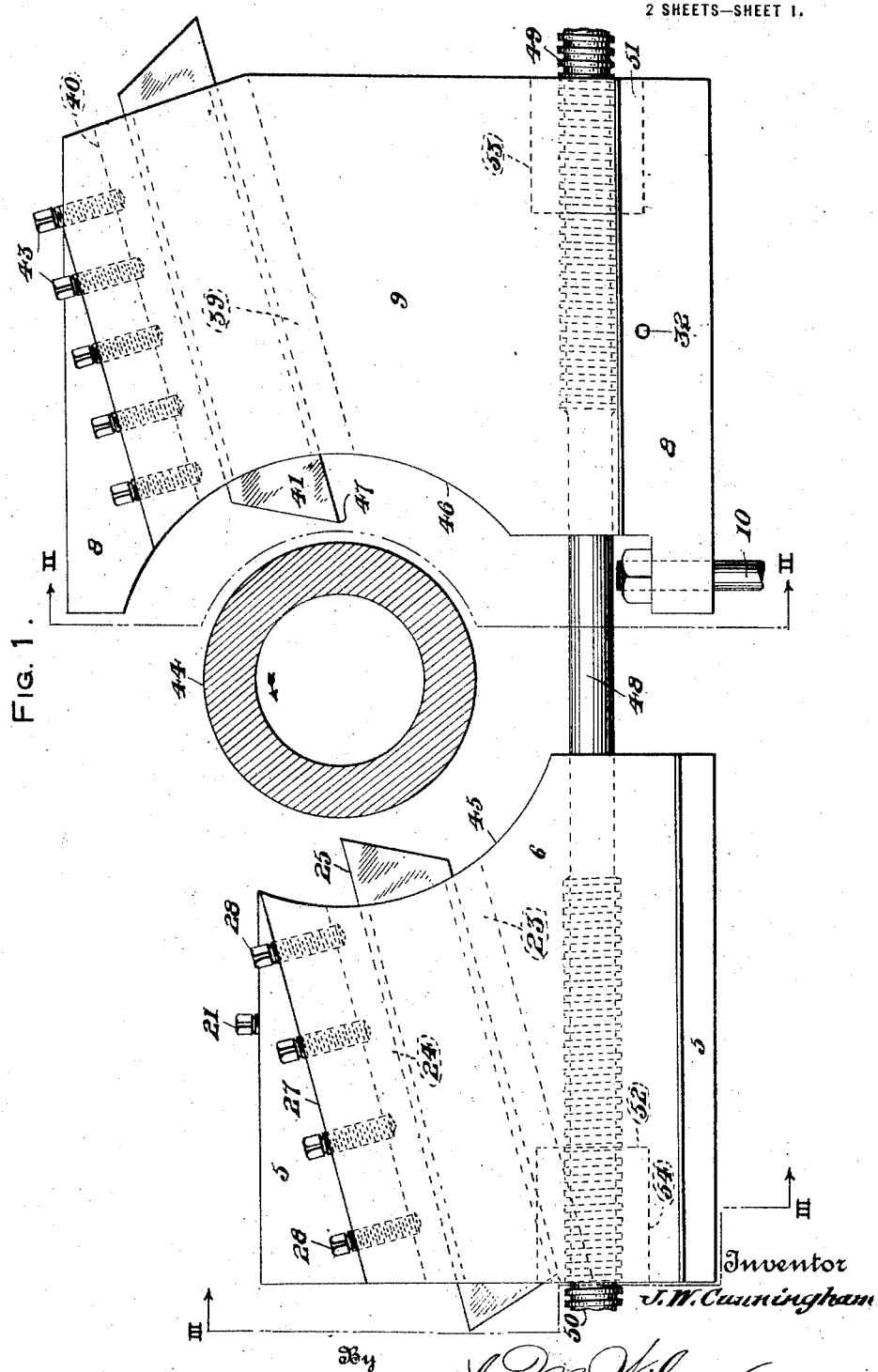

UNITED STATES PATENT OFFICE.

JOHN WILBER CUNNINGHAM, OF MANOR, PENNSYLVANIA.

MULTIPLE LATHE TOOL-POST.

1,366,249.  Specification of Letters Patent.  Patented Jan. 18, 1921.

Application filed December 4, 1918, Serial No. 265,243. Renewed June 11, 1920. Serial No. 388,349.

*To all whom it may concern:*

Be it known that I, JOHN WILBER CUNNINGHAM, a citizen of the United States of America, residing at Manor, in the county of Westmoreland and State of Pennsylvania, have invented certain new and useful Improvements in Multiple Lathe Tool-Posts, of which the following is a specification.

This invention relates to certain new and useful improvements in multiple lathe tool posts and has among its principal objects the provision of this type of device which is extremely simple in plan of construction as well as durable and efficient in operation.

A further object of the invention is to provide a tool post having provision for operatively supporting a plurality of tools for simultaneous adjustment toward and away from each other, novel and improved means for slidably supporting the tools being provided whereby clogging of the parts is effectively prevented.

With the above general objects in view and others that will become apparent as the nature of the invention is better understood, the same consists in the novel form, combination and arrangement of parts hereinafter more fully described, shown in the accompanying drawings and claimed.

In the accompanying drawings, wherein like characters of reference refer to corresponding parts throughout the several views, Figure 1 is a side elevational view of the multiple tool post constructed in accordance with the present invention, the work to be operated on being illustrated in section operatively disposed between the tools.

Fig. 2 is an end view of the rear tool supporting post with the adjusting screw shown in transverse section and taken substantially upon line II—II of Fig. 1, and Fig. 3 is an end view of the forward tool supporting post with the adjusting screw shown in transverse section and taken substantially upon line III—III of Fig. 1.

Referring more in detail to the several views, the present invention embodies a support 5 adapted to slidably receive a front tool carrier 6 as more clearly hereinafter described and adapted to be rigidly bolted to a lathe carriage by means of bolts, one of which is shown at 7 in Fig. 3. Directly opposite to the support 5 is a rear support 8 adapted to slidably receive the rear tool carrier 9 and intended to be bolted rigidly to a lathe carriage by means of the bolts 10.

The support 5 is in the form of a casting having a flat base as clearly shown in Fig. 3 so as to properly seat upon the upper face of a lathe carriage and the same is cut away in one side face as at 11 to provide a vertical bearing face 12 for the slidable tool holder 6. Extending upwardly from the base of the support 5 is a longitudinal rib 13 provided with vertical faces 14 adjacent the base thereof along opposite sides of the same. The rib 13 extends upwardly from the vertical faces 14 in substantially inverted V-shaped form to provide converging or inclined faces 15. The tool holder 6 is provided with a bottom groove 16, the walls of which are proportioned and arranged so as to snugly engage the faces 14 and 15 of the rib 13 and thereby effectively guide said tool holder 6 in its sliding movements in a manner to prevent any lateral movement. In order to additionally guard against lateral movement of the tool holder or slide 6, the upper portion of the latter is provided with a longitudinal rib 17 having an inclined side face 18 slightly spaced from the similarly inclined face 19 of the support 5. A suitable gib or plate 20 is positioned between the faces 18 and 19 and is engaged by the inner end of a set screw 21 which is threaded through the top of the support 5. It will be seen that by rotating the screw 21 in one direction, the same is caused to bear against the gib 20 and thereby force the vertical face of the tool holder 6 against the vertical face 12 of the base or support 5, at which time the rib 13 is snugly seated within the groove 16 of the tool holder 6. The gib 20 additionally prevents the tool holder 6 from tilting forward or backward which the same has a tendency to do during the cutting operation.

The tool holder or slide 6 is formed with a longitudinal inclined slot 22 within which is disposed a grooved liner strip 23 and a grooved liner strip 24, the cutting tool 25 being arranged with its lower portion within the groove of the strip 23 and with its upper edge within the groove 26 of the strip 24.

The upper face of the tool holder or slide 6 is provided with a forwardly and downwardly inclined surface portion 27 and threaded through the same at this point are a plurality of set screws 28 having their inner ends bear against the upper face of the liner strip 24 so as to firmly clamp the cutting tool 25 in position as clearly shown in Figs. 1 and 3.

The rear support 8 is constructed somewhat similar to the front support 5 although of larger size as clearly shown in Figs. 1 and 2, it being noted that the tool holder or slide 9 instead of being grooved at the bottom thereof as indicated at 16 with respect to the tool holder 6, is provided with an inclined face 29 slightly spaced from the inclined face 30 of the support 8, and a gib 31, similar to the gib 20 in Fig. 3 is placed between the faces 29 and 30 and adjusted against the face 29 by means of a horizontal set screw 32 threaded through the rib 33 of said support 8. Also, the tool holder 9 is provided at the upper portion thereof with a longitudinal rib 34 similar to the rib 13 carried by the support 5 and positioned within the longitudinal groove 35 of the support 8 similar to the groove 16 in the tool holder or slide 6. The tool holder 9 is provided with a vertical inner face 36 flatly engaging the inner face 37 of the support 8 and is also provided with a longitudinal inclined slot 38 within which is positioned a grooved liner strip 39 and a grooved liner strip 40. The upper edge of the cutting tool 41 is received within the groove 42 of the liner strip 40 and the lower portion of said cutting tool is located within the groove of the strip 39, while a plurality of set screws 43 are threaded through the tool holder 9 so as to bear upon the liner strip 40 and thereby firmly clamp the cutting tool 41 in its operative position. The adjacent ends of the members 5 and 6, and 8 and 9 are concaved concentrically to the axis of the work 44 as indicated at 45 and 46 in Fig. 1 and the rib 34 is extended forwardly to a point beyond a point on a vertical line passing through the point 47 of the cutting tool 41, thus giving the said tool 41 a solid bearing.

In order to effectively adjust the slides or tool holders 6 and 9 simultaneously toward the work 44, a shaft 48 is provided which may be rotated by any suitable means and which is provided with threaded ends 49 and 50 screwed within the internally threaded bushings 51 and 52 which are rigidly secured respectively within the sockets 53 and 54 of the slides 9 and 6. As the threads 49 and 50 are of opposite pitch, it is obvious that upon rotation of the shaft 48 in one direction, the slides 6 and 9 will be moved toward each other simultaneously and vice versa.

As the work 44, in operation, is rotated in the direction of the arrow indicated in Fig. 1, the strain on the tool 25 is downwardly while the strain on the tool 41 is upwardly, and in order to effectively brace the tool 41 against upward strain, the tool holder 9 is made larger than the tool holder 6 and arranged to be engaged by a larger number of set screws 43 than is the case with the set screws 28 provided for the tool 25 as shown in Fig. 1.

The support 5 has been herein termed the front support by reason of the fact that the same is nearest the operator when in use and it is noted that while the tools herein shown and described are especially adapted for cutting off and facing work, it is nevertheless to be understood that any other lathe tool may be used in the present device by simply slotting the tool post to suit the particular tool necessary to perform the work desired.

Owing to the short space in which two tool posts must travel on a lathe in order to be fed into the center, it has always been a difficult matter to have the tools operate smoothly and free from chattering, while the rear tool, being raised while being fed toward the center, had a tendency to slide over scale chips, etc., that collected in the slide. When this occurred, and the pressure was taken off the tool, the tool post was firmly embedded on the return of the post and as this return of the post is usually accomplished by hand, the same was impeded. Much time and labor is lost in this way and the present invention is designed to prevent the same by reason of its practical construction and the durable nature of the same.

In operation, the work 44, herein illustrated as a tubular shell, is suitably clamped to the head of the lathe stock spindle and then rotation is imparted to the latter to thereby cause rotation of the work 44 in the direction of the arrow as indicated in Fig. 1. The shaft 48 is then rotated so as to adjust the tool holders or slides 6 and 9 toward each other and thereby simultaneously cause engagement of the cutting points of the tools 25 and 41 with the work 44. By proper manipulation, the work 44 may be turned as desired and as the supports 5 and 8 are rigidly bolted to the lathe carriage, the same will be fed with said carriage longitudinally of the work 44 so as to operate upon any portion of the work 44 between the opposite ends thereof. It is believed that further description of the operation of the device will be unnecessary in view of the well known nature thereof and it is believed that the foregoing description will convey a clear idea as to the construction and advantages of the present device to those skilled in the art.

It is to be understood that while the form of the invention herein shown and described is what is believed to be the preferable embodiment thereof, minor changes may be made in the form, combination and arangement of parts without departing from the spirit and scope of the same as claimed.

What I claim as new is:—

1. A tool holder comprising a support cut away at one side to provide a vertical guide face and provided with an upwardly extending longitudinal rib adjacent the base thereof having vertical and inclined guide faces, a tool holder slidably mounted within the cutaway portion of said support and provided with a vertical side face bearing against the vertical face of the support, said tool holder having a groove in the base thereof slidably snugly resting upon the vertical and inclined faces of the support rib, and means to maintain the vertical faces of the tool holder and base in intimate contact.

2. A tool holder comprising a support cut away at one side to provide a vertical bearing face and an upper inclined surface, said support being provided with an upwardly extending rib at the base thereof provided with vertical and inclined faces, a tool holder mounted in the cut-away portion of said support and provided with a vertical face flatly engaging the vertical face of said support, said tool holder having an upper inclined surface slightly spaced from the inclined surface of said support, a gib plate interposed between said inclined surfaces, an adjusting screw threaded through said support and engaging said gib plate, said tool holder being provided with a groove receiving said rib, substantially as described.

3. In a multiple tool post, a front support cut away at one side to provide a vertical bearing face and an upper inclined surface, said support having an upwardly extending rib adjacent the base thereof provided with vertical and inclined faces, a tool holder slidably mounted within the cut-away portion of said support having a vertical face flatly engaging the vertical bearing face of said support and provided with an inclined surface slightly spaced from said inclined surface of the support, a gib plate between said inclined surfaces, a set screw adjustably carried by said support and bearing against said gib plate, said tool holder having a longitudinal groove in the bottom thereof snugly receiving said support rib, a rear relatively larger support cut-away at one side to provide a vertical bearing face and an upper longitudinal groove having inclined and vertical walls, a tool holder slidably mounted in the cut-away portion of said rear support and provided with an upper rib snugly seating within the groove of said support, said tool holder having a vertical face flatly engaging the vertical bearing face of said rear support and having an inclined lower surface, a longitudinal rib adjacent the base of said rear support having an inclined surface spaced from the inclined surface of said last named tool holder, a gib plate disposed between the last named inclined surfaces, and a set screw carried by said rear support and bearing against the last named gib plate.

4. A tool holder comprising a support cut-away at one side to provide a vertical bearing face and an inclined surface, said support being provided with an inwardly extending rib, a tool holder mounted in the cut-away portion of said support and provided with a vertical face flatly engaging the vertical face of said support, said tool holder having an inclined surface slightly spaced from the inclined surface of said support, a gib plate interposed between said inclined surfaces, and an adjusting screw threaded through said support and engaging said gib plate, said tool holder being provided with a groove receiving said rib.

In testimony whereof I affix my signature.

JOHN WILBER CUNNINGHAM.